(12) United States Patent
Mutnury et al.

(10) Patent No.: US 10,795,592 B2
(45) Date of Patent: Oct. 6, 2020

(54) SYSTEM AND METHOD FOR SETTING COMMUNICATION CHANNEL EQUALIZATION OF A COMMUNICATION CHANNEL BETWEEN A PROCESSING UNIT AND A MEMORY

(71) Applicant: DELL PRODUCTS, LP, Round Rock, TX (US)

(72) Inventors: Bhyrav M. Mutnury, Round Rock, TX (US); Stuart Allen Berke, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 90 days.

(21) Appl. No.: 15/588,234

(22) Filed: May 5, 2017

(65) Prior Publication Data

US 2018/0321845 A1    Nov. 8, 2018

(51) Int. Cl.
| | |
|---|---|
| *G06F 3/06* | (2006.01) |
| *G06F 13/16* | (2006.01) |
| *G06F 9/44* | (2018.01) |
| *H04L 25/03* | (2006.01) |
| *G06F 9/4401* | (2018.01) |

(52) U.S. Cl.
CPC ............ *G06F 3/0632* (2013.01); *G06F 3/061* (2013.01); *G06F 3/0683* (2013.01); *G06F 9/4401* (2013.01); *G06F 13/1668* (2013.01); *G06F 13/1689* (2013.01); *G06F 13/1694* (2013.01); *H04L 25/03076* (2013.01)

(58) Field of Classification Search
CPC ...... G06F 3/061; G06F 3/0632; G06F 3/0655; G06F 3/0688; G06F 9/4401; G06F 9/445; H04L 25/03076
See application file for complete search history.

(56) References Cited

U.S. PATENT DOCUMENTS

| | | | |
|---|---|---|---|
| 8,374,049 B2 | 2/2013 | Liu et al. | |
| 9,325,536 B2 * | 4/2016 | Patel | ................. H04L 25/03878 |
| 9,785,604 B2 * | 10/2017 | Mejia | .................. G06F 13/4282 |
| 9,893,912 B1 * | 2/2018 | Wei | ...................... H04L 27/2614 |
| 2007/0058470 A1 * | 3/2007 | Nierle | ...................... G11C 5/04 |
| | | | 365/221 |
| 2008/0147897 A1 * | 6/2008 | Talbot | ................. G06F 13/1673 |
| | | | 710/8 |

(Continued)

*Primary Examiner* — Glenn Gossage
(74) *Attorney, Agent, or Firm* — Larson Newman, LLP (57) ABSTRACT

An information handling system includes a processing unit that is coupled to a memory device by a communication channel. The processing unit includes a memory controller and is configured to host a basic input output system (BIOS). The memory device, which may include a dual in-line memory module (DIMM), stores serial presence detect (SPD) information. In an embodiment, the BIOS obtains the SPD information and parameters of the communication channel, such as channel impedance and channel length. In this embodiment, the BIOS uses a look-up table to determine an equalization of the communication channel based on the obtained SPD information and the obtained parameters of the communication channel, and utilizes the memory controller to set the equalization of the communication channel, such as by setting or controlling settings of transmission and reception components of the memory controller.

20 Claims, 6 Drawing Sheets

(56) References Cited

U.S. PATENT DOCUMENTS

| | | | |
|---|---|---|---|
| 2008/0165694 A1* | 7/2008 | Sauber | H04L 5/1438 370/252 |
| 2008/0256281 A1 | 10/2008 | Fahr et al. | |
| 2009/0113144 A1* | 4/2009 | Tokunaga | G06F 9/44505 711/154 |
| 2010/0046600 A1* | 2/2010 | Zerbe | H04L 25/0307 375/233 |
| 2010/0293420 A1* | 11/2010 | Kapil | G06F 12/08 714/710 |
| 2013/0163646 A1* | 6/2013 | Lai | H04L 25/03878 375/219 |
| 2014/0095854 A1* | 4/2014 | Chen | G06F 9/4401 713/1 |
| 2016/0011802 A1* | 1/2016 | Berke | G06F 3/0619 711/166 |
| 2016/0041943 A1* | 2/2016 | Hollis | G06F 13/4243 710/106 |
| 2018/0357066 A1* | 12/2018 | Farkas | G06F 13/385 |

\* cited by examiner

SYSTEM AND METHOD FOR SETTING COMMUNICATION CHANNEL EQUALIZATION OF A COMMUNICATION CHANNEL BETWEEN A PROCESSING UNIT AND A MEMORY

FIELD OF THE DISCLOSURE

This disclosure generally relates to information handling systems, and more particularly relates to setting an equalization of a communication channel coupling a processing unit and a memory.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

An example information handling system is a processing unit in communication with one or more memory devices over one or more communication channels.

SUMMARY

An information handling system may include a processing unit and a memory device. The processing unit includes a memory controller and hosts a basic input output system (BIOS). The memory device is communicatively connected to the memory controller by a communication channel and stores memory device information. The BIOS obtains the memory device information and sets an equalization of the communication channel based on the memory device information. The BIOS may further set the equalization of the communication channel based on parameters of the communication channel.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
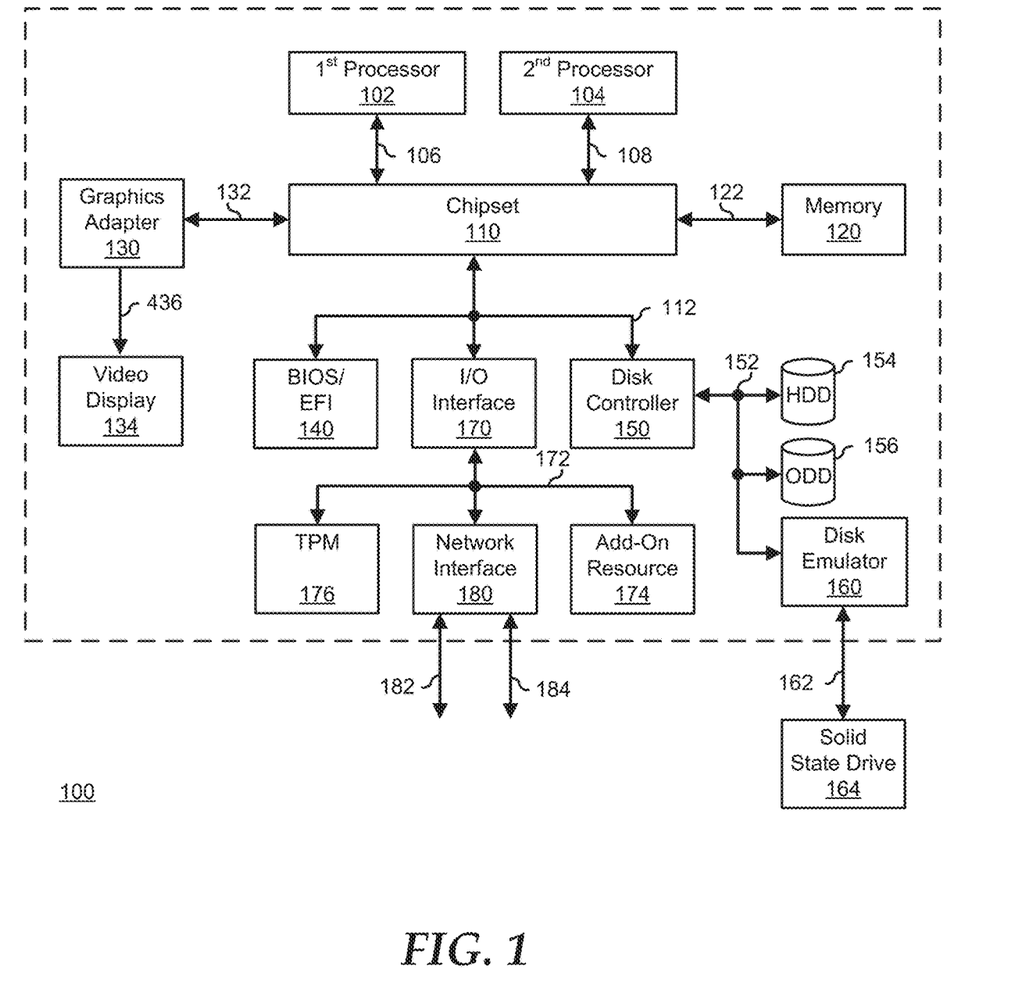
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as an SoC, or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above. Information handling system 100 includes processors 102 and 104, a chipset 110, a memory 120, a graphics adapter 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer System Interface (SCSI) interface, an Inter-Integrated Circuit (I$^2$C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) interface such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a trusted platform module (TPM) 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics adapter, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand™ channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a Central Processing Unit (CPU), a Programmable Logic Array (PLA), an embedded device such as a System-On-a-Chip (SoC), or other control logic hardware. An information handling system can also include one or more computer-readable media for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

An example information handling system is a server. The server in turn may include other information handling systems. An example information handling system in a server may be a central processing unit (CPU) device comprising a CPU in communication with one or more memory devices, such as dual in-line memory modules (DIMMs). A DIMM is a memory for data storage comprising a series of dynamic random-access memory integrated circuits. There has been a proliferation of the number of individual DIMMs supported by a CPU. As a result, there has been an increase in the connection length across sets of DIMMs such that the CPU to DIMM connection length increasingly varies. In addition, communication speeds between CPUs and DIMMs are increasing, increasing the difficulty of data transfer due to consequent problems with signal acquisition between a DIMM and CPU.

Furthermore, there is also variance among DIMMs because different DIMMs may be manufactured by different manufacturers and used in a single information handling system or model of information handling system. For example, to differentiate DIMMs, DIMM manufacturers sometimes go beyond a DIMM specification to design DIMMs. This could be in terms of raw card improvement or printed circuit board (PCB) material improvement or silicon process improvement, for example. This is usually evident from the laboratory testing on DIMM products. For a given DIMM capacity and rank type, a DIMM manufactured by one DIMM manufacturer is better or a DIMM manufactured by one DIMM manufacturer is worse.

To communicate with DIMMs across all the above variances, equalization of communication channels is generally ramped up to maximum to ensure signal and communication acquisition between a CPU and the DIMMs. Thus the equalization on the communication channel between the CPU and the DIMMs is static, and the equalization is the same for each DIMM. That is, there is a fixed equalization parameter indiscriminately applied across all DIMMs for the corresponding communication channels.

To efficiently communicate with individual DIMMs, equalization may be individually and dynamically set for the individual communication channel between the CPU and individual DIMM based on the individual DIMM, and further, based on the individual communication channel. In this way, power consumption due to communications between the CPU and individual DIMM is optimized. Equalization of a channel is the optimal settings of a filter (in transmitter or receiver) that help signal integrity by compensating for the loss in signal during transmission. Optimal equalization without over compensating the signal will help both signal integrity and result in power savings. Furthermore, over-equalization of a communication channel relative to an individual DIMM may also diminish signal integrity for signal acquisition. Thus, the signal eye diagram of communications between the CPU and individual DIMM is sub-optimal for both over and under compensation.

Figure 2:
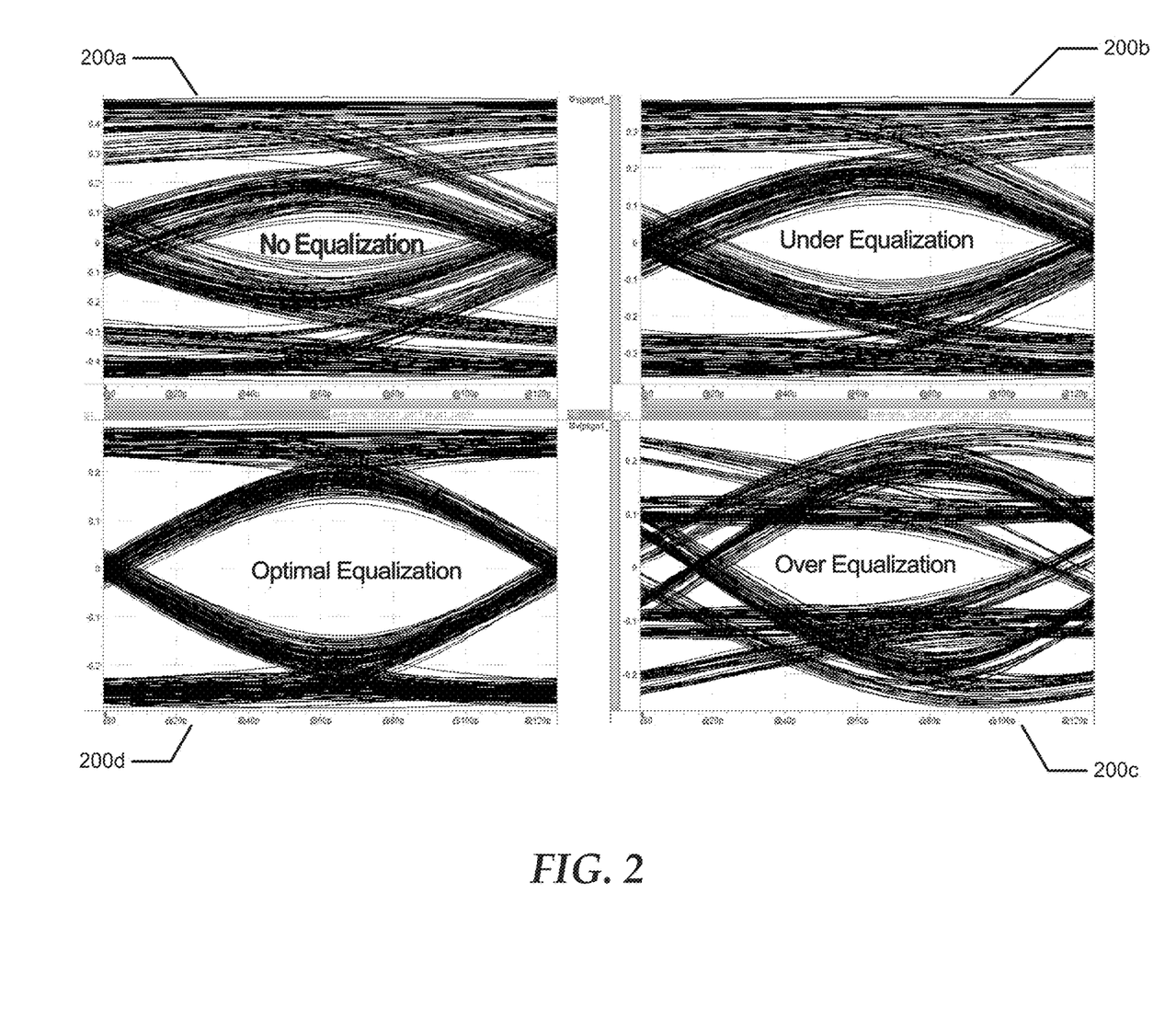
FIG. 2 illustrates a set of plots of eye diagrams for different equalizations according to a first embodiment of the present disclosure.

FIG. 2 shows a set of plots 200a-200d indicating various eye diagrams for equalization between a CPU and individual DIMM. In plot 200a, there is no equalization of the communication channel between the CPU and DIMM, and the eye diagram shows a small squinting eye suboptimal for signal acquisition. In plot 200b, there is under equalization of the communication channel between the CPU and DIMM, and the eye diagram shows a small eye suboptimal for signal acquisition. In plot 200c, there is over equalization of the communication channel between the CPU and DIMM, and the eye diagram shows a compressed eye suboptimal for signal acquisition. In plot 200d, there has been an optimized equalization of the communication channel between CPU and DIMM, and the eye diagram shows a wide eye optimal for signal acquisition.

In embodiments, equalization of an individual communication channel between the CPU and the individual DIMM may be based on individual DIMM characteristics or properties and individual communication channel characteristics or properties. For example, information such as DIMM serial presence detect (SPD) information may indicate the DIMM type, capacity, manufacturer, and other DIMM properties. SPD information for an individual DIMM may be stored on the individual DIMM and accessed and used to set equalization for the communication channel between the DIMM and CPU. Similarly the physical length or other properties of an individual communication channel between an individual DIMM and CPU may be used to determine and set the equalization for the individual communication channel. Thus individual communication channels will have equalizations for the communication channels individually set for the communication channels based on the DIMM(s) associated with the communication channel. This may be done dynamically or performed upon an initialization of DIMM memory with the CPU.

For example, an individual DIMM may have memory storing SPD information for the individual DIMM. A memory such as an erasable programmable read-only memory (EPROM) may be appended to an individual DIMM and the EPROM may store SPD information for the individual DIMM. A DIMM manufacturer may append the memory to the DIMM at the time of manufacture and write the SPD information of the DIMM to the memory. The CPU may set transmission and reception (equalization) settings for the communication channel between the CPU and individual DIMM based upon the individual DIMM SPD information and communication channel properties, thereby providing an optimized equalization of the communication channel between the CPU and individual DIMM based upon the individual DIMM and communication channel.

Figure 3:
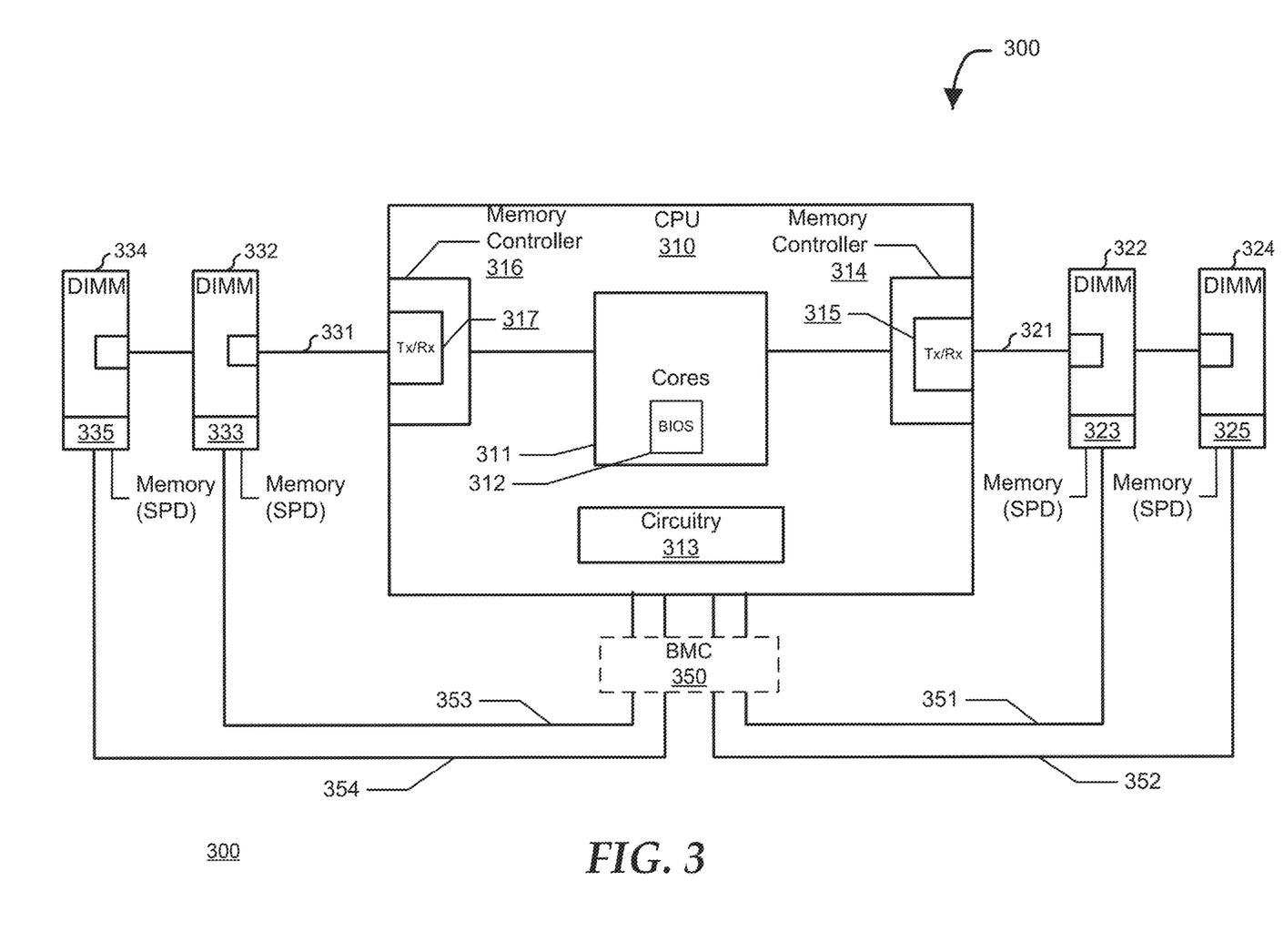
FIG. 3 illustrates an information handling system including a processing unit according to a first embodiment of the present disclosure.

An example CPU DIMM system 300 is shown in FIG. 3. System 300 includes CPU 310 in communication with DIMM pairs 322 and 324, and 332 and 334. CPU 310 includes core set 311 which is the set of processor cores of CPU 310. One or more processor cores of core set 311 host the Basic Input/Output System (BIOS) 312 of CPU 310. The BIOS is firmware used to perform hardware initialization during the booting process and provides an abstraction layer for the hardware. CPU 310 includes CPU circuitry 313 and memory controllers 314 and 316. Memory controller 314 has transmission and reception components 315 which may be used to set an equalization for a communication channel. Memory controller 316 has transmission and reception components 317 which may be used to set an equalization for a communication channel.

Cores or core set 311 is connected to memory controllers 314 and 316, and BIOS 312 may initialize and control transmission and reception components 315 and 317, respectively, to set the equalization provided by transmission and reception components 315 and 317 and thus by memory controllers 314 and 316.

DIMMs 322 and 324 form a DIMM pair and are connected to CPU 310 generally, and memory controller 314 particularly, by communication channel 321. CPU 310 may access DIMMs 322 and 324 over communication channel 321. Communication channel 321 may include a conductive trace. Communication channel 321 is connected to transmission and reception components 315 of memory controller 314, such that an equalization of communication channel 321 may be performed by setting transmission and reception components 315. Communications between CPU 310 and DIMMs 322 and 324 may be according to the double data rate fourth-generation (DDR4) standard or variants thereof.

DIMM 322 includes memory 323 which may be an EPROM or other non-volatile memory; memory 323 stores SPD information for DIMM 322. Similarly, DIMM 324 includes memory 325 which may be an EPROM; memory 325 stores SPD information for DIMM 324. CPU 310, for example, BIOS 312, may obtain SPD information for DIMMs 322 and 324, from memories 323 and 325, respectively, and set settings of transmission and reception components 315 to set the equalization for communication channel 321 based on the individual SPD information for DIMMs 322 and 324. For example, when CPU DIMM system 300 is part of a server, the server baseboard management controller (BMC) 350 may be connected to memories 323 and 325 by channels 351 and 352, respectively, such that BMC 350 may access SPD information for DIMMs 322 and 324 in memories 323 and 325 and provide this SPD information to CPU 310 and BIOS 312. In double data rate fourth-generation (DDR4), channels 351 and 352 are System Management Bus (SMB), but may be Inter-Integrated Circuit ($I^2C$), Improved Inter-Integrated Circuit ($I^3C$), or any other suitable channel. BIOS 312 obtains SPD information for DIMMs 322 and 324 from memories 323 and 325, respectively. Then BIOS 312 sets the transmission and reception components 315 to provide a desired equalization of channel 321 based on the SPD information for DIMMs 322 and 324.

While CPU 310 and BIOS 312 are shown and discussed as receiving SPD information for DIMMs 322 and 324 via BMC 350, as would be understood by one of skill in the art, this is an example exposition, not a limitation on how the BIOS obtains SPD information for DIMMs; the BIOS obtains SPD information for DIMMs on a communication channel and uses this SPD information to set equalization for the channel.

Furthermore, BIOS 312 may be aware of communication channel properties such as the absolute or relative length of communication channel 321, such as a length of a conductive trace, or an impedance. For example, the board characteristics may be provided by a manufacturer through an on-board (erasable programmable read-only memory) EPROM-like or field replaceable unit (FRU) device to provide characteristics of the as-built material. BIOS 312 may set transmission and reception components 315 to provide a desired equalization of channel 321 based on known communication channel properties of communication channel 321. Thus, equalization of communication channel 321 by BIOS 312 may be based on both communication channel properties of communication channel 321 and SPD information for DIMMs 322 and 324 coupled to communication channel 321 to provide an individual equalization for communication channel 321.

Furthermore, while in FIG. 3, two DIMMs 322 and 324 are shown as coupled to communication channel 321, and equalization for communication channel 321 is set based on SPD information of DIMMs 322 and 324, this is by way of exposition, and a communication channel may support any number of DIMMs such that the equalization for the communication channel is set based on SPD information of the DIMMs using the communication channel.

BIOS 312 may use algorithms or a look-up table to determine the desired equalization for communication channel 321 based on SPD information for DIMMs 322 and 324 and communication channel properties of communication channel 321, and set transmission and reception components 315 to provide the desired equalization for communication channel 321. For example, based on the SPD information, individual DIMMs could be characterized as strong performing DIMMs, medium performing DIMMs, or weak performing DIMMs by the BIOS. The BIOS could then determine the relative performance of DIMMs coupled to an individual communication channel and set the equalization for the communication channel based on the performance of the DIMMs. For a communication channel with strong performing DIMMs, equalization of the communication channel might be set low or relatively lower to save power; diametrically, for a communication channel with weak performing DIMMs, equalization of the communication channel might be set high or relatively higher to ensure signal acquisition and communication between a CPU and DIMMs over the communication channel. Per the above exposition, individual communications channels will have a corresponding individual equalization. Thus, better DIMMs may be accessed with weaker and less power consumption equalization and lesser DIMMs can be accessed with stronger equalization whereby the CPU DIMM system DIMMs work optimally in the system.

As would be understood by one in the art and as discussed above, channel parameters of a communication channel may also be used and be a factor in setting equalization for the communication channel. Channel parameters may be obtained through an EPROM on the system PCB programmed by the manufacturer, or in situ via running specialized test circuits in the DDR interface which allow capturing and extraction of relevant parameters, or fixed in BIOS by characterization performed during engineering development, or other means. Channel parameters can be pre-fed into BIOS from either modeling and simulations, or from measurement data of the channel loss. The BIOS may use one or more algorithms or access a look-up table or both to determine equalization for a communication channel based on both the properties of DIMMs using the communication channel and the parameters of the communication channel itself. For example, a degree of equalization may be set based on a length of a conductive trace forming the communication channel. The equalization may also then be set based on the DIMM type.

DIMMs 332 and 334 form a DIMM pair and are connected to CPU 310 generally, and memory controller 316 particularly, by communication channel 331. Communication channel 331 differs from communication channel 321, for example in length, and a different equalization may thus be desired. CPU 310 may access DIMMs 332 and 334 over communication channel 331. Communication channel 331 may include a conductive trace. Communication channel 331 is connected to transmission and reception components 317 of memory controller 316, such that an equalization of communication channel 331 may be performed by setting transmission and reception components 317.

DIMM 332 includes memory 333 which may be an EPROM; memory 333 stores SPD information for DIMM 332. Similarly, DIMM 334 includes memory 335 which may be an EPROM; memory 335 stores SPD information for DIMM 334. CPU 310, for example, BIOS 312, may obtain SPD information for DIMMs 332 and 334, from memories 333 and 335, respectively, and set settings of transmission and reception components 317 to set the equalization for communication channel 331 based on the individual SPD information for DIMMs 332 and 334. For example, when CPU DIMM system 300 is part of a server, the server BMC 350 may be connected to memories 333 and 335 by channels 353 and 353, respectively, such that BMC 350 may access SPD information for DIMMs 332 and 334 in memories 333 and 335 and provide this SPD information to CPU 310 and BIOS 312. BIOS 312 obtains SPD information for DIMMs 332 and 334 from memories 333 and 335, respectively. Then BIOS 312 sets the settings of transmission and reception components 317 to provide a desired equalization of communication channel 331 based on SPD data and communication channel parameters, such as length.

Figure 4:
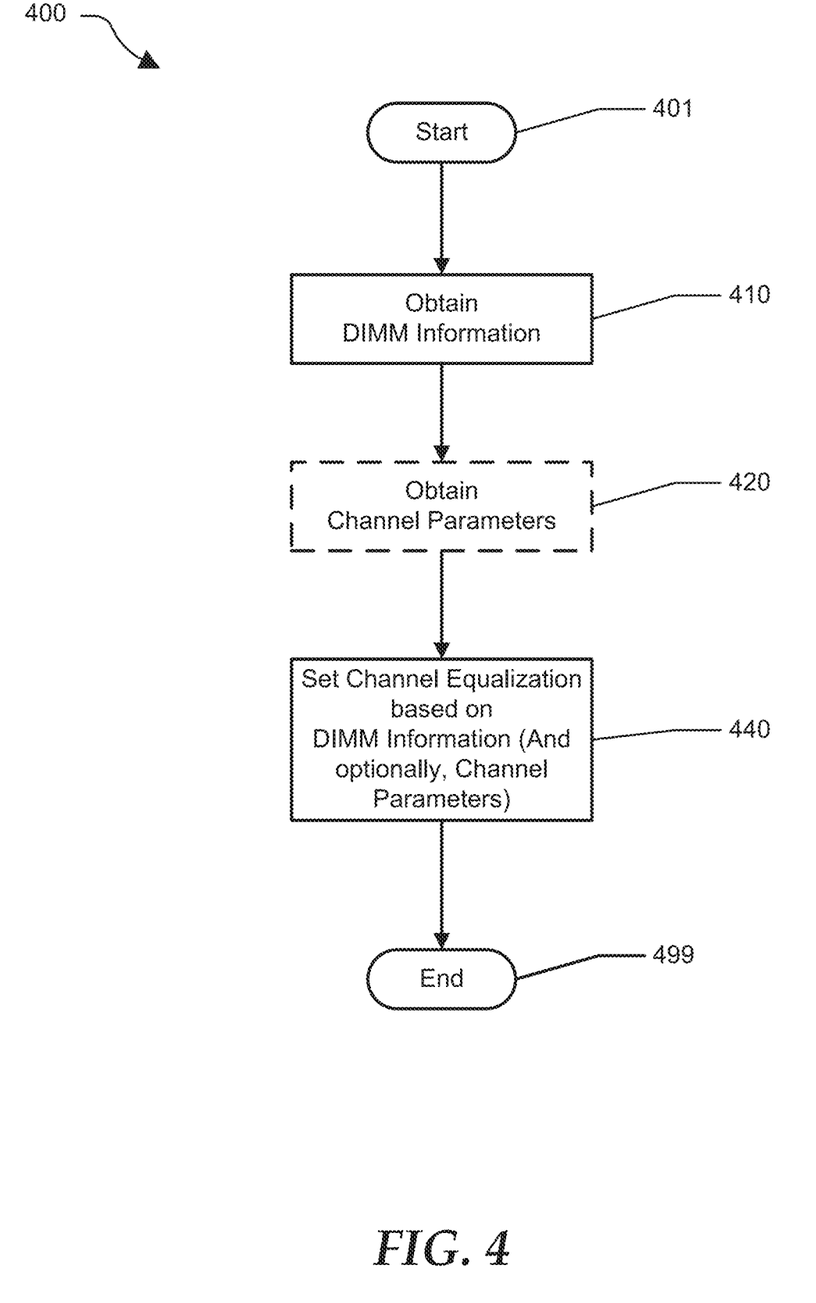
FIG. 4 illustrates a flowchart for communication channel equalization according to an embodiment of the present disclosure.

FIG. 4 shows a flowchart of a process 400 for setting the equalization of a communication channel communicatively connecting a CPU and DIMM(s). At 401, process 400 begins. At 410, DIMM information is obtained for a DIMM. For example, a BIOS hosted by the CPU may obtain the DIMM information such as SPD information. At 420, channel information for the communication channel may optionally be obtained. At 440, equalization for the communication channel is set based on the DIMM information obtained at 410. Equalization setting may be made to the memory controllers, but may also be made at the DIMM on the DRAMs or buffers. Future DRAMs/DIMMs are expected to have enhanced ability to participate in equalization optimizations. Equalization for the communication channel may also optionally be set based upon the channel information obtained at 420. At 499, process 400 ends.

Process 400 may be performed at an initialization of an information handling system such as a server comprising a CPU with DIMMs or upon connecting one or more DIMMs to a CPU. Thus there may be dynamic and individual setting of communication channel equalization of individual communication channels.

Figure 5:
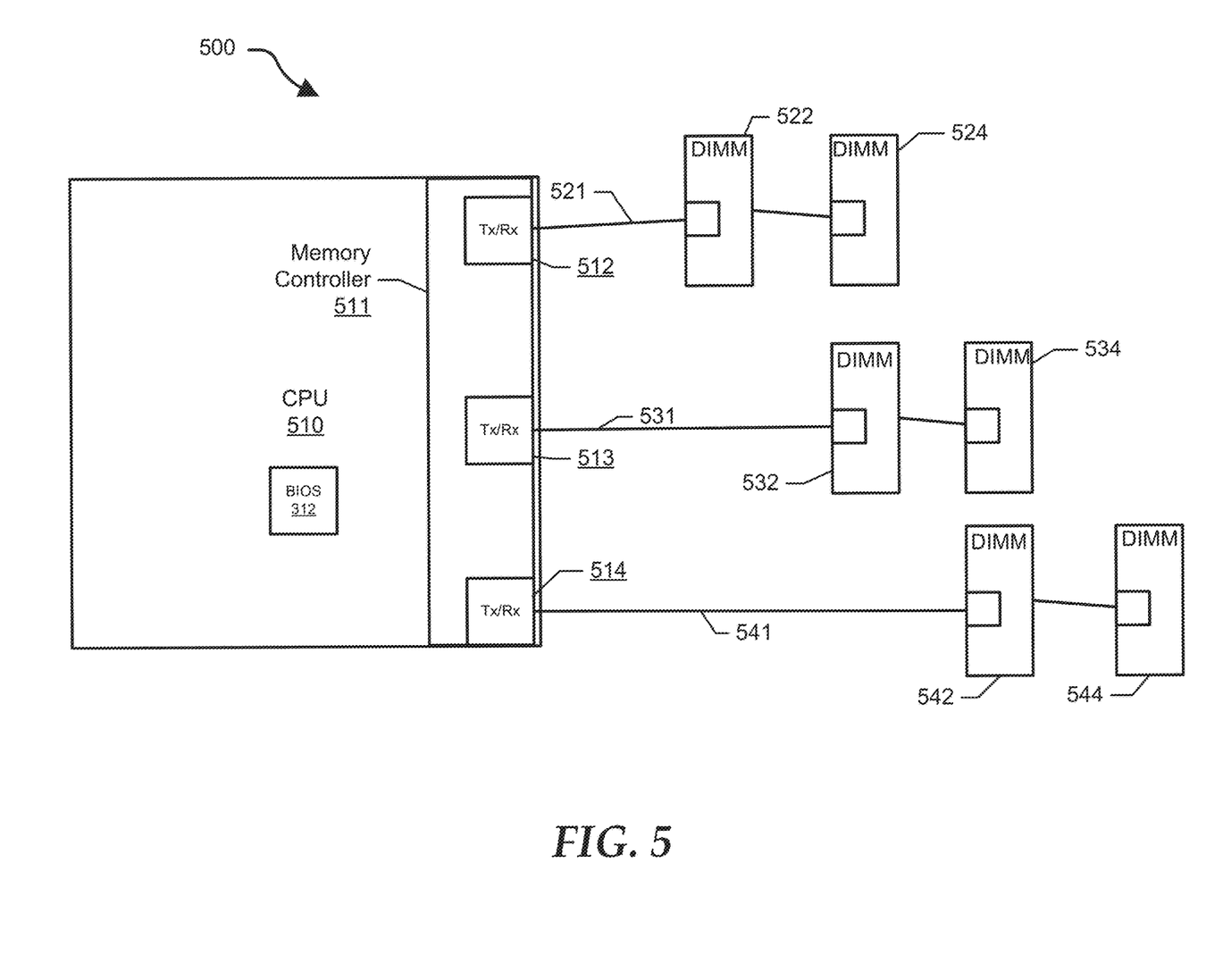
FIG. 5 illustrates an information handling system including a processing unit according to a second embodiment of the present disclosure.

An example CPU DIMM system 500 is shown in FIG. 5. System 500 includes CPU 510 configured to communicate with three DIMM pairs 522 and 524, 532 and 534, and 452 and 544. CPU 510 is connected to DIMM pair 522 and 524 by communication channel 521. Communication channel 521 may include a conductive trace. CPU 510 is connected to DIMM pair 532 and 534 by communication channel 531. Communication channel 531 may include a conductive trace. And CPU 510 is connected to DIMM pair 542 and 544 by communication channel 541. Communication channel 541 may include a conductive trace.

More particularly, CPU 510 includes memory controller 511. Memory controller 511 includes transmission and reception components 512 for communication channel 521, transmission and reception components 513 for communication channel 531 and transmission and reception components 514 for communication channel 541. Settings of transmission and reception components 512 may be set to provide a desired equalization for communication channel 521, settings of transmission and reception components 513 may be set to provide a desired equalization for communication channel 531 and settings of transmission and reception components 514 may be set to provide a desired equalization for communication channel 541.

As shown in FIG. 5, communication channels 521, 531 and 541 may differ in length, and thus have different equalizations set. Communication channel 531 is longer than communication channel 521 and communication channel 541 is longer than communication channels 521 and 531. Thus, equalization may be higher for channel 541 than for channels 531 and 521, and equalization may be higher for channel 531 than for channel 521. That is, a BIOS running on CPU 510 (not shown) will set settings of transmission and reception components 512, 513 and 514 to provide different equalizations for channels 521, 531 and 541, respectively, based on parameters of channels 521, 531 and 541, such as, for example, length or impedance.

Figure 6:
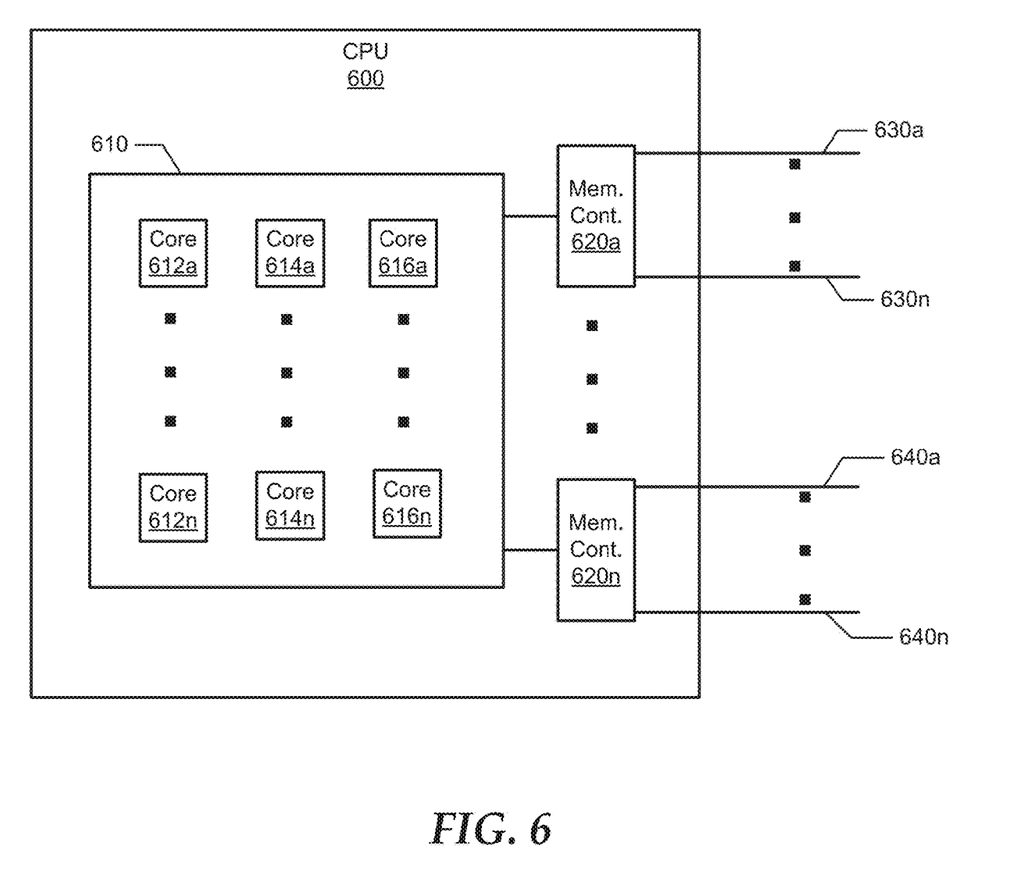
FIG. 6 illustrates an information handling system including a processing unit according to a third embodiment of the present disclosure.

FIG. 6 shows CPU 600 which illustrates CPU hardware. CPU 600 includes core set 610 which is the set of processor cores of CPU 600. Core set 610 includes processor cores 612a-612n, 614a-614n and 616a-616n. Core set 610 is connected to memory controllers 620a-620n. For example, individual cores may be connected to individual memory controllers, or multiple processor cores may be connected to memory controllers. Processor cores 612a, 614a and 616a may be connected to and use memory controller 620a to access DIMM(s). Each of memory controllers 620a-620n may support multiple communication channels for accessing one or more DIMMs. Memory controller 620a supports communication channels 630a-630n and memory controller 620n supports communication channels 640a-640n.

Memory controllers 620a-620n may include transmission and reception components per supported communication channel or sets of supported communication channels. Memory controller components such as feed forward equalization (FFE) and the number of taps and settings for FFE and decision feedback equalization (DFE) and the number of taps/settings for DFE can be set to affect the equalization. As the number of taps increase, the equalization impact will increase. A CPU may support 16 DIMMs per socket via four channels per CPU socket side. For example, a CPU may implement 8 DDR4 channels and support up to 2 DIMMs per channel and thus 16 DIMMs per CPU socket (CPU device). The 8 channels are divided into 4 channels per physical side of the CPU package to allow routing in the fewest possible PCB layers and shortest possible length.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function, and equivalents thereof.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest reasonable interpretation of the following claims and their equivalents, and shall not be restricted or limited by the foregoing detailed description.

What is claimed is:

1. An information handling system comprising:
a control processing unit including a first set of processor cores and a second set of processor cores that are coupled to a first memory controller and a second memory controller, respectively, of the control processing unit, wherein the control processing unit is configured to host a basic input output system (BIOS); and
a first set of memory devices and a second set of memory devices that are coupled to the first memory controller and the second memory controller, respectively, wherein a first set of communication channels couples the first set of memory devices to the first memory controller while a second set of communication channels couples the second set of memory devices to the second memory controller, wherein the first set of communication channels includes a first communication channel to couple a first memory device to the first memory controller, and a second communication channel to couple a second memory device to the first memory controller, wherein the BIOS initially sets settings of transmission and reception components of the first memory controller and the second memory controller based upon channel parameters pre-fed into the BIOS from models performed on the first and second communication channels, wherein the BIOS resets the settings of the transmission and reception components of the first memory controller and the second memory controller based upon an in situ testing that extracts relevant parameters of respective communication channels in the first set of communication channels and the second set of communication channels, wherein the BIOS again resets the settings of the transmission and reception components of the first memory controller and the second memory controller based upon data loss measurements of corresponding communication channels in the first set of communication channels and the second set of communication channels, the BIOS to determine a performance of the first set of memory devices, to characterize the performance of the first set of memory devices into one of a plurality of performance levels, wherein the plurality of performance levels includes a strong performance level, a medium performance level, and a weak performance level, and to set an equalization of the first set of communication channels to one of a plurality of equalization levels based on the one of the plurality of performance levels characterized for the first set of memory devices, wherein the first communication channel is set to a first equalization to save power based on the first memory device being characterized into the strong performance level and the second communication channel is set to a second equalization based on the second memory device being characterized into the weak performance level, wherein the first equalization is lower than the second equalization.

2. The information handling system of claim 1, wherein the first set of memory devices includes a first memory device and a second memory device that store first memory device information and second memory device information, respectively, wherein the BIOS obtains the first memory device information and sets an equalization of a communication channel in the first set of communication channels that connect the first memory device to a corresponding transmission and reception component of the first memory controller based on the obtained first memory device information.

3. The information handling system of claim 2, wherein the BIOS initially sets the settings of the corresponding transmission and reception component of the first memory controller based on a communication channel length of the communication channel in the first set of communication channels that connects the first memory device to the first memory controller.

4. The information handling system of claim 2, wherein the first memory device includes a first non-volatile memory storing the first memory device information and the BIOS obtains the first memory device information from the first non-volatile memory.

5. The information handling system of claim 4, wherein the first non-volatile memory is an erasable programmable read-only memory (EPROM) appended to the first memory device by a manufacturer of the first memory device and the first memory device information is written to the EPROM by the manufacturer.

6. The information handling system of claim 4, wherein a server processor is communicatively connected to the first non-volatile memory, reads the first memory device information from the first non-volatile memory, and provides the first memory device information to the BIOS.

7. The information handling system of claim 6, wherein the server processor is a baseboard management controller (BMC) of a server comprising the information handling system.

8. The information handling system of claim 1, wherein the first set of memory devices includes a dual in-line memory module.

9. The information handling system of claim 2, wherein the first set of memory devices information includes serial presence detect information.

10. The information handling system of claim 2, wherein the first memory device information includes capacity information.

11. The information handling system of claim 9, wherein the BIOS determines the performance of the first set of memory devices from the serial presence detect information and sets an equalization of the first set of communication channels based on the first memory device performance.

12. The information handling system of claim 1, wherein the extracted relevant parameters of each communication channel in the first set of communication channels include a communication channel length of the communication channel that connects a first memory device of the first set of memory devices to the first memory controller.

13. An information handling system comprising:
a control processing unit including a first set of processor cores and a second set of processor cores that are coupled to a first memory controller and a second memory controller, respectively, of the control processing unit wherein the control processing unit is configured to host a basic input output system (BIOS);
a first set of memory devices coupled to the first memory controller, the first set of memory devices including:
a first memory device communicatively connected to a first transmission and reception component of the first memory controller by a first communication channel and having a first set of memory device information stored on the first memory device; and
a second memory device communicatively connected to a second transmission and reception component of the first memory controller by a second communication channel and having a second set of memory device information stored on the second memory device,
wherein the BIOS initially sets settings of the first and second transmission and reception components of the first memory controller based upon channel parameters pre-fed into the BIOS from models performed on the first and second communication channels, wherein the BIOS resets the settings of the transmission and reception components of the first memory controller and the second memory controller based upon an in situ testing that extracts relevant parameters of the first communication channel and the second communication channel, wherein the BIOS again resets the settings of the first and second transmission and reception components of the first memory controller based upon data loss measurements in the first communication channel and the second communication channel, the BIOS to determine a first performance of the first memory device, to determine a second performance of the second memory device, to characterize each of the first and second performances of the first and second memory devices into a corresponding one of a plurality of performance levels, wherein the plurality of performance levels includes a strong performance level, a medium performance level, and a weak performance level, and to set an equalization of each of the first and second communication channels to a corresponding one or a plurality of equalization levels based on the one of the plurality of performance levels characterized for the first and second memory devices, wherein the first communication channel is set to a first equalization to save power based on the first memory device being characterized into the strong performance level and the second communication channel is set to a second equalization based on the second memory device being characterized into the weak performance level, wherein the first equalization is lower than the second equalization.

14. The information handling system of claim 13, wherein the BIOS sets an equalization of the first communication channel based on an impedance of the first communication channel.

15. The information handling system of claim 14, wherein the BIOS sets the equalization of the first communication channel based upon the stored first set of memory device information.

16. The information handling system of claim 13, wherein the first memory device includes a first non-volatile memory storing the first set of memory device information and the BIOS obtains the first set of memory device information from the first non-volatile memory.

17. The information handling system of claim 16, wherein a server processor is communicatively connected to the first non-volatile memory, reads the first set of memory device information from the first non-volatile memory, and provides the first set of memory device information to the BIOS.

18. The information handling system of claim 13, wherein the first memory device is a dual in-line memory module.

19. A method comprising:
connecting a control processing unit including a first set of processor cores and a second set of processor cores to a first memory controller and a second memory controller, respectively, of the control processing unit wherein the control processing unit is configured to host a basic input output system (BIOS);
connecting a first set of memory devices to the first memory controller, the first set of memory devices including a first memory device communicatively connected to a first memory controller transmission and reception component by a first communication channel and having a first set of memory device information stored on the first memory device, and a second memory device communicatively connected to a second memory controller transmission and reception component by a second communication channel and having a second set of memory device information stored on the second memory device;
obtaining, by the BIOS, the first set of memory device information and the second set of memory device information, wherein the BIOS initially sets settings of the first memory controller transmission and reception component and the second memory controller transmission and reception component based upon channel parameters pre-fed into the BIOS from models performed on the first and second communication channels, wherein the BIOS resets the settings of the transmission and reception components of the first memory controller and the second memory controller based upon an in situ testing that extracts relevant parameters of the first communication channel and the second communication channel, wherein the BIOS again resets the settings of the first memory controller transmission and reception component and the second memory controller transmission and reception component based upon data loss measurements in the first communication channel and the second communication channel;
determining, by the BIOS, a first performance of the first memory device;
determining, by the BIOS, a first performance of the first memory device;
characterizing each of the first and second performances of the first and second memory devices into a corresponding one of a plurality of performance levels, wherein the plurality of performance levels includes a strong performance level, a medium performance level, and a weak performance level;
setting an equalization of the first communication channel to a first equalization of a plurality of equalization levels based on the first memory device being characterized into the strong performance level; and
setting an equalization of the second communication channel to a second equalization of the plurality of equalization levels based on the second memory device being characterized into the weak performance level, wherein the first equalization is lower than the second equalization.

20. The method of claim 19, wherein the first memory device is a dual in-line memory module.

* * * * *